Oct. 17, 1967   F. CELORIO MENDOZA   3,347,178
KNEADING MACHINES

Filed May 24, 1965   2 Sheets-Sheet 1

INVENTOR.
FAUSTO CELORIO MENDOZA
BY Ogle R. Singleton
ATTORNEY

Oct. 17, 1967   F. CELORIO MENDOZA   3,347,178
KNEADING MACHINES

Filed May 24, 1965   2 Sheets-Sheet 2

INVENTOR.
FAUSTO CELORIO MENDOZA
BY
*Ogle R. Singleton*
ATTORNEY

United States Patent Office 3,347,178
Patented Oct. 17, 1967

3,347,178
KNEADING MACHINES
Fausto Celorio Mendoza, Mexico City, Mexico
(Calzada San Esteban 57, Naucalpan, Mexico)
Filed May 24, 1965, Ser. No. 458,149
8 Claims. (Cl. 107—36)

My invention is related to kneading machines and more specifically a milling-kneading machine which is characterized by having a feeding worm commonly used in this type of machine, two milling stones suitably arranged in order that the dough on leaving the feeding worm will pass therebetween to produce comminuted and refined particles from the coarse particles of dough, thereby providing dough more affinated and kneaded than in kneading machines now known. There are already known several types of kneaders which pick and lift the dough, but in this type of machine a fine and uniform dough is never produced.

Taking into account these disadvantages in the already known kneaders, I have invented a new kneader which besides kneading, mills and refines the mixture, achieving this with a uniformity and fineness of the dough which can not be obtained by the known machines. Another object of my invention is to provide a kneading machine which besides kneading the mixture will produce a much more uniform mixing and easy graduation of the fineness of the dough.

Figure 1:
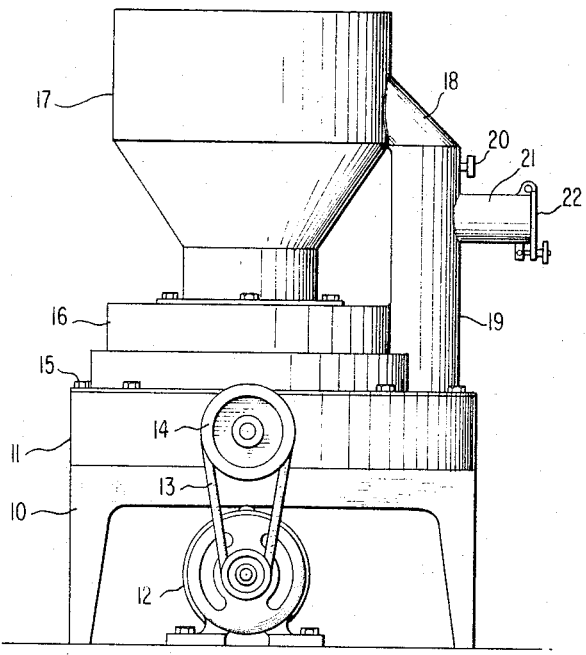
Figure 2:
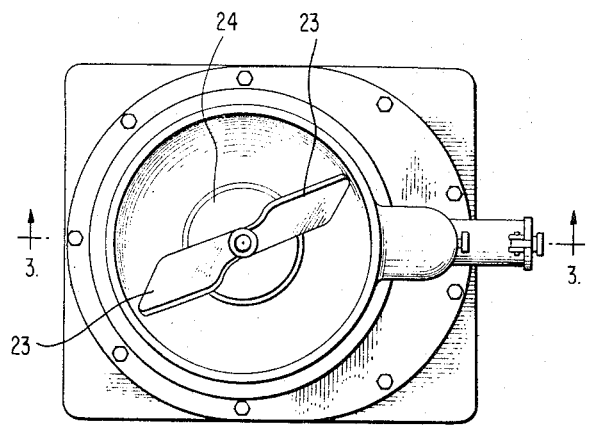
Figure 3:
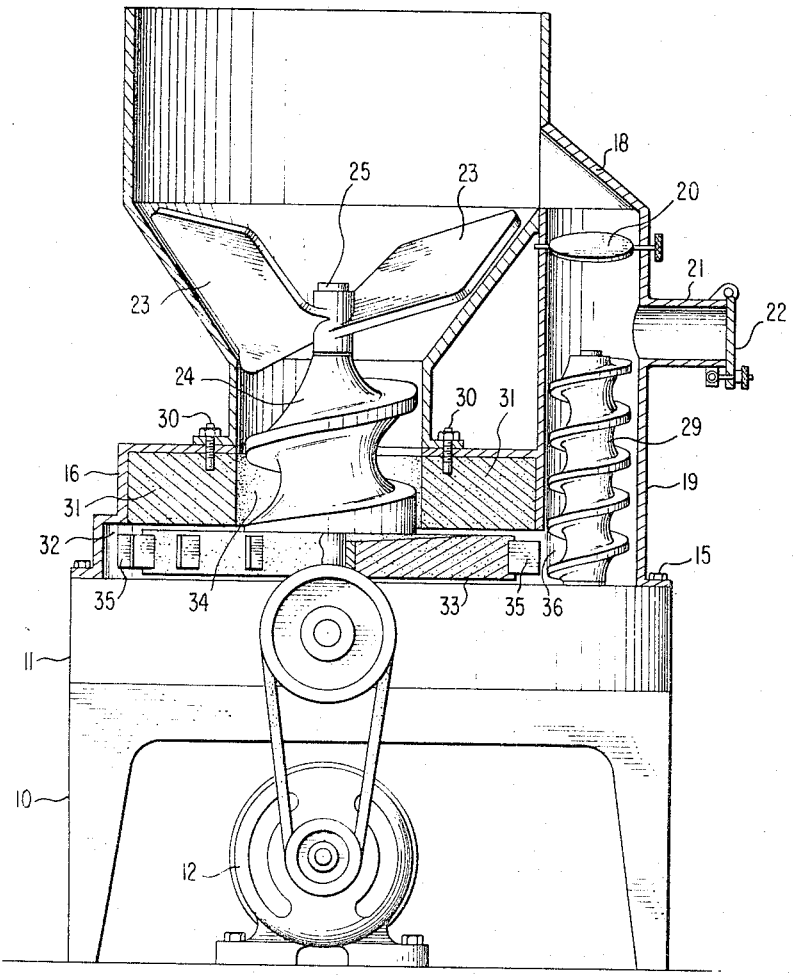

Other objects and advantages of my invention will appear as the specification proceeds, taken in connection with the accompanying drawings, wherein:

FIG. 1 is a side elevation of my machine;
FIG. 2 is a top plan of the machine;
FIG. 3 is a vertical section on the line 3—3 of FIG. 2.

In FIG. 1 the outer structure of the machine is shown, comprising a base 10 on which a gear box 11 is suitably attached receiving motion from motor 12 through band 13 and pulley 14. Upon this box 11 by means of screws 15 a cover 16 is mounted. On top of the cover 16, a hopper 17 is mounted into which the dough which is to be kneaded is introduced. The hopper 17 has a sloping pipe 18, suitably coupled to its side, and connected with a vertical pipe 19 which is provided at its upper end with a damper 20, and an outlet pipe 21 at its side with a closure 22.

In FIG. 2 are shown the flights 23 and worm 24 which are within the hopper 17 and which have as an object to drive the dough mixture into the kneading machine.

In FIG. 3 the interior of the kneading machine is shown.

When the motion provided by motor 12 is transmitted to the gears in box 11, these drive shaft 25 on which the worm 24 and flights 23 are coupled, and at the same time in the vertical pipe 19 a worm 29 is mounted with its shaft receiving driving motion through the gears in the box 11, to drive the dough well towards the outlet pipe 21 or when the closure 22 is closed towards the hopper 17.

Within the cover 16 and by means of screws 30 a stationary milling stone 31 is fastened, having at its center a bore 34 through which the worm 24 freely passes, leaving a gap 32, regulatable by means of the screws 30, between this stone 31 and the other milling stone 33 which is immediately under stone 31. This stone 33 has rotary motion as it is mounted on the shaft 25, and is slightly concave on its upper face and is also provided with a plurality of paddles 35 equidistant throughout all its periphery for displacing the dough toward the worm 29 through an opening 36.

When the dough to be kneaded is deposited in hopper 17, flights 23 drive it towards the spiral worm 24 which forces it to penetrate into the gap 32 and into the concavity of the stone 33, being thereby milled and refined to the desired degree, because the lower stone 33 has rotary motion while the stone 31 is stationary. The dough after passing through the gap 32 leaves the machine in the direction of the perimeter with the aid of the paddles 35 and enters through opening 36 to the worm 29 which lifts it towards the outlet pipe 21 through which it leaves when the closure 22 is opened. In case a more complete refining is required, it will suffice to close closure 22 and to open the damper 20 and then the dough not encountering a free way through the outlet pipe 21 and being driven by the worm 29, will enter again the hopper 17 through the pipe 18, thereby causing a continuous recirculation cycle of the dough until the desired degree of comminution and refining is achieved.

Having described my invention, what I claim is:

1. A kneading machine for dough, having a hopper, means for forcing dough from said hopper to a gap between the surfaces of milling members, means for adjusting the size of said gap and means for producing relative motion among said milling members in combination with a conduit leading from said gap to said hopper and containing means for forcing dough from said gap toward said hopper through said conduit.

2. The kneading machine of claim 1 in which the means for forcing dough from the said hopper is a spiral worm having rotating flights in said hopper.

3. The kneading machine of claim 1 in which an upper one of said milling members is held stationary and is vertically adjustable to regulate the size of said gap and thereby adjust the refinement of the dough.

4. The kneading machine of claim 1 provided with two milling stones arranged one above the other with a generally horizontal gap therebetween, one of said stones being vertically adjustable to regulate the size of said gap, one of said stones being slightly concave on its face adjacent said gap, and said motion being a rotary motion.

5. The kneading machine of claim 4 in which the upper milling stone is held stationary while the lower milling stone is provided with said rotation means.

6. The kneading machine of claim 1 in which the means for forcing dough from said gap toward said hopper includes a vertically arranged spiral worm for lifting the dough from said gap.

7. The kneading machine of claim 1 in which a milling stone is provided with rotation means and with paddles at its periphery to force dough from said gap.

8. The kneading machine of claim 1 in which an outlet for dough is provided in said conduit downstream of said means for forcing dough from said gap.

References Cited

UNITED STATES PATENTS

| | | | |
|---|---|---|---|
| 20,370 | 5/1858 | Rand | 241—246 |
| 566,069 | 8/1896 | Faust | 241—246 X |
| 650,291 | 5/1900 | Zimmerman | 241—246 |
| 937,950 | 10/1909 | Nolte | 241—246 X |
| 1,794,972 | 3/1931 | Mayer | 259—7 X |
| 2,266,652 | 12/1941 | McLean | 259—8 |
| 2,445,617 | 7/1948 | Hofmann | 241—246 X |
| 2,692,124 | 10/1954 | Mendoza | 259—97 |
| 2,725,815 | 12/1955 | Hansen | 259—8 X |
| 3,111,278 | 11/1963 | Buschman | 251—246 X |

WILLIAM I. PRICE, *Primary Examiner.*